(12) United States Patent
He

(10) Patent No.: US 7,389,534 B1
(45) Date of Patent: Jun. 17, 2008

(54) METHOD AND APPARATUS FOR ESTABLISHING VIRTUAL PRIVATE NETWORK TUNNELS IN A WIRELESS NETWORK

(75) Inventor: Haixiang He, Woburn, MA (US)

(73) Assignee: Nortel Networks Ltd (CA)

( * ) Notice: Subject to any disclaimer, the term of this patent is extended or adjusted under 35 U.S.C. 154(b) by 716 days.

(21) Appl. No.: 10/608,601

(22) Filed: Jun. 27, 2003

(51) Int. Cl.
  *H04L 29/00* (2006.01)
(52) U.S. Cl. .................................. 726/15; 713/153
(58) Field of Classification Search .............. 726/15
  See application file for complete search history.

(56) References Cited

U.S. PATENT DOCUMENTS

| | | | | |
|---|---|---|---|---|
| 6,831,921 | B2 * | 12/2004 | Higgins | 370/401 |
| 6,976,177 | B2 * | 12/2005 | Ahonen | 726/3 |
| 7,174,456 | B1 * | 2/2007 | Henry et al. | 713/158 |
| 2002/0129271 | A1 * | 9/2002 | Stanaway et al. | 713/201 |
| 2002/0144144 | A1 * | 10/2002 | Weiss et al. | 713/201 |
| 2003/0079121 | A1 * | 4/2003 | Gilman et al. | 713/153 |
| 2004/0068668 | A1 * | 4/2004 | Lor et al. | 713/201 |
| 2004/0192309 | A1 * | 9/2004 | Watanabe et al. | 455/439 |

OTHER PUBLICATIONS

Perkins, et al., Internet Engineering Task Force (IETF) Internet Draft, "AAA Registration Keys For Mobile IP, draft-ietf-mobileip-aa-key-13.txt" Jun. 2003.
Glass, et al. IETF Request For Comments (RFC) 2977 "Mobile IP Authentication, Authorization, and Accounting Requirements," Oct. 2000.
Dommety, et al., "AAA Requirements From Mobile IP," unknown publication date.

* cited by examiner

*Primary Examiner*—Matthew B Smithers
(74) *Attorney, Agent, or Firm*—Anderson Gorecki & Manaras, LLP

(57) ABSTRACT

VPN tunnels may be established from a wireless user through a wireless network without requiring the wireless user to have a relationship with the wireless network. Instead, the wireless user interfaces with an authentication, authorization, and accounting service on a VPN host network. This allows the wireless user to sign on once to gain admittance to both the wireless network and the VPN host network. The VPN host network is able to establish accounts on various wireless network providers to alleviate the need for wireless users to have individual accounts with the wireless providers. Additionally, a wireless access point on the wireless network serves as a VPN gateway to interface between an encrypted session on the wireless network and a VPN tunnel formed between the wireless access point and the VPN host network. This allows the wireless access device to participate in a VPN tunnel without instantiating a VPN client.

16 Claims, 4 Drawing Sheets

METHOD AND APPARATUS FOR ESTABLISHING VIRTUAL PRIVATE NETWORK TUNNELS IN A WIRELESS NETWORK

BACKGROUND OF THE INVENTION

1. Field of the Invention

The present invention relates to communication networks and, more particularly, to a method and apparatus for establishing Virtual Private Network (VPN) tunnels in a wireless network.

2. Description of the Related Art

Data communication networks may include various computers, servers, nodes, routers, switches, hubs, proxies, and other devices coupled to and configured to pass data to one another. These devices will be referred to herein as "network devices." Data is communicated through the data communication network by passing data packets (or data cells or segments) between the network devices by utilizing one or more communication links. A particular packet may be handled by multiple network devices and cross multiple communication links as it travels between its source and its destination over the network.

The various network devices on the communication network communicate with each other using predefined sets of rules, referred to herein as protocols. Different protocols are used to govern different aspects of the communication, such as how signals should be formed for transmission between network devices, various aspects of what the data packets should look like, and how packets should be handled or routed through the network by the network devices.

A Virtual Private Network may be formed by connecting two or more networks or network devices over a public network using encryption or other means, such as by attaching a unique label to traffic in a Multiprotocol Label Switching (MPLS) network, to secure the transmissions between the two or more networks or network devices. Using VPN tunnels over a public network such as the Internet enables a network having geographically separated components to be set up as a single autonomous network without requiring the network participants to lease dedicated lines through the network. As used herein, "VPN site" will be used to refer to a network or portion of a network that is to be connected to a VPN tunnel.

When a person seeks to establish or join a VPN tunnel on a wireless network, such as a network operating under one of the 802.11x protocols, the user must first log onto the wireless network and then be connected to the VPN tunnel. This requires the user to have or establish an account on the wireless network as well as an account with the network associated with the VPN site.

FIG. 1 illustrates a conventional system in which a wireless user 10 is able to obtain VPN services over a wireless network 12 through a wireless access point 14. As shown in FIG. 1, a wireless user 10 in a conventional wireless network 12 uses a two step log-on process to first establish its identity with the wireless network, and then establish its identity with the VPN host network. Specifically, upon gaining access to the wireless network, the wireless user will seek to gain admittance to the wireless network by engaging an Authentication, Authorization, and Accounting (AAA) server 16 associated with the wireless network. The process of engaging the AAA server enables the wireless network to verify the user's identity and authorization to access the network, and establish accounting entries to enable the wireless network to invoice the wireless user for admittance to the wireless network. If the wireless user is successful, a Dynamic Host Configuration Protocol (DHCP) server associated with the wireless network assigns the wireless user an IP address on the wireless network and otherwise enables communication to take place on the wireless network.

Once the wireless user has been granted admittance to the wireless network, if the wireless user desires to participate on a VPN tunnel with a VPN host network 18, the wireless user initiates a protocol exchange with the VPN host network. The VPN host network may be a corporate network to which the wireless user would like to obtain access or another network or network device. The wireless user provides the VPN host network with authentication and authorization information, such as a corporate ID and password, which is used to authenticate the user and ascertain whether the user has authorization to access the network and/or participate in VPN communications with the VPN host network. Typically, the VPN host network will utilize an AAA server 20 to perform authorization and authentication services on behalf of the VPN host network. If the authorization and authentication procedures are successful, the VPN host network grants admittance to the wireless user and assigns a VPN host network private IP address to the wireless network user using its DHCP server. The VPN host network private IP address is then used by the wireless network device as the end point for a VPN tunnel 22 between the wireless user 10 and the VPN host network 18. The VPN tunnel 22 may extend through the Internet 24 or other network.

Requiring the wireless user to log onto the wireless network as well onto the VPN host network thus results in a duplication of services. Specifically, both the wireless network point and the VPN host network must authenticate and authorize the user before the user can establish a VPN tunnel to the VPN host network. This duplication results in added setup time as well as added expense.

Additionally, communications on the wireless network may involve double encryption, over the wireless portion of the VPN tunnel. Specifically, in the conventional scenario discussed above in connection with FIG. 1, the VPN tunnel extends from the wireless user to the VPN host network. Thus, communications between the VPN host network and the wireless user are typically encrypted using an encryption protocol such as IP Sec. Additionally, to prevent other wireless users from intercepting communications on the wireless network, communications on the wireless link are typically encrypted using Wired Equivalency Protocol (WEP), Temporal Key Integrity Protocol (TKIP), or another protocol that may be used to secure 802.11 wireless LANs. The double encryption between the user and the wireless access point (WEP/TKIP and IP Sec) increases the latency associated with transmissions between the corporation and the wireless user. This double encryption also uses additional resources on the wireless device, which may reduce the amount of time a battery powered wireless device is able to participate in wireless communications.

The fact that the wireless access point is not participating in establishing the VPN tunnel between the VPN host network and the wireless user requires the wireless user to have VPN software, such as a VPN client, loaded on the wireless access device. Where the wireless access device is a small computing device, such as a personal data assistant (PDA) or telephone handset, it may be unreasonable to expect the wireless access device to be able to support a VPN client or to engage in an IPSec protocol exchange.

SUMMARY OF THE INVENTION

The present invention overcomes these and other drawbacks by providing a method and apparatus for establishing VPN tunnels in a wireless network. According to one embodiment of the invention, a wireless network device may establish a VPN tunnel over a wireless network without first requiring the wireless network device to gain admittance to the wireless network. Instead, in this embodiment, the wireless user interfaces with an authentication, authorization, and accounting (AAA) service on a VPN host network which is trusted by the wireless network. Interfacing with an AAA service on the VPN host network allows the wireless user to sign on once to access both the wireless network and the VPN host network. The VPN host network is able to establish accounts on various wireless network providers to alleviate the need for wireless users to have individual accounts with the wireless providers. Additionally, a wireless access point on the wireless network serves as a VPN gateway to map encrypted traffic on the wireless network to a VPN tunnel, for example a L2 or L3 tunnel, formed between the wireless access point and the VPN host network. This allows the wireless access device to participate in a VPN tunnel without instantiating a VPN client.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

According to an embodiment of the invention, wireless network access may be obtained on a wireless network without requiring a wireless network user to have a pre-established relationship with the wireless network. For example, in one embodiment, a wireless user may access a VPN tunnel via a wireless network without requiring a wireless user to have an account on the wireless network or otherwise gain admittance to the wireless network. As used herein, the phrase "gain admittance to the wireless network" will refer to determining by the wireless network whether the wireless user has authorization to participate in communications on the wireless network.

Allowing a wireless user to participate in communications over VPN tunnels via a wireless network without gaining admittance to the wireless network, allows the wireless user to participate in a single authorization and authentication session to join or establish a VPN tunnel with a VPN host network. Additionally, since the wireless user does not need to gain admittance to the wireless network, the wireless user does not need to have an user account with the wireless network. Remuneration for wireless services provided on behalf of the wireless user may be provided by the host VPN or billed to the wireless user's account on the host VPN. Accordingly, a wireless user does not need to establish accounts with multiple wireless access providers but rather can establish a single account at the host VPN through which all billing matters can be handled. Where the host VPN is a corporation and the wireless user is a corporate employee, this facilitates access to the corporate network by allowing the corporation to establish service level agreements with various wireless access providers on behalf of its employees.

Figure 2:
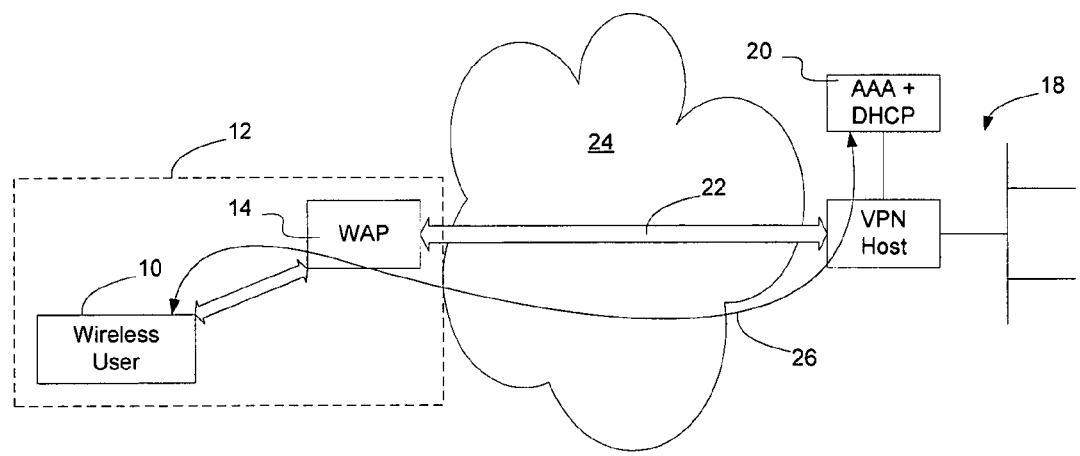
FIG. 2 is a functional block diagram of a wireless communications network configured to enable a VPN tunnel to be established between a wireless user and a VPN host network according to an embodiment of the invention.

FIG. 2 illustrates an embodiment of the invention in which a wireless user is able to obtain VPN services and establish a VPN tunnel 22 to a VPN host network 18. As shown in FIG. 2, a wireless user 10 seeking to obtain VPN services over a wireless network 12 transmits identification information 26 to a wireless access point. The wireless access point, rather than attempting to authenticate the user and ascertain authorization for the user, passes the identification information 26 to the VPN host network 18. The VPN host network utilizes the identification information to ascertain the identity of the wireless user (authentication) and to ascertain whether the wireless user is allowed to interface with the VPN host network over a VPN tunnel (authorization). Optionally, the VPN host network may also ascertain an account status for the individual to check, for example, whether the wireless user has an outstanding balance or any other impediments to allowing the wireless user to incur additional wireless expenses or expenses associated with accessing the VPN host network.

In one embodiment, the identification information may include a conceptual ID, such as a VPN ID, a host network user identification alphanumeric string (user ID), and a host network password (user password). Where enhanced authentication is required the wireless user may be required to include a token or other indicia as proof of identity.

A digital certificate may be used to authenticate the wireless network device being used by the wireless user. Additionally, a suitable user authentication protocol, such as Password Authentication Protocol (PAP) or Challenge Handshake Authentication Protocol (CHAP) may be utilized to authenticate the user of the network device. The invention is not limited in this regard as other forms of authentication may be utilized as well.

The wireless access point 14 utilizes the VPN ID to identify an existing VPN tunnel to which the user would like to obtain access. If no tunnel exists, the public IP address of the VPN host network associated with the VPN ID is used by the wireless access point to connect to the appropriate VPN host network. The wireless access point 14 maintains the VPN ID and passes the user ID (UID) and user password (U Pwd) to the VPN host network.

In one embodiment, the identification information is passed to the wireless access point using an 802.1x setup message or otherwise through a normal wireless authentication channel. In this embodiment, the VPN ID or other corporate ID is not encrypted and is thus visible to the wireless access point. The user ID, password, and any other associated information to be passed to the VPN host network can be encrypted. The setup message may be an Extensible Authentication Protocol (EAP) message, which is being adopted by the 802.1x standard that allows security authentication data to be passed between a RADIUS server (part of the VPN host network AAA server) and the access point and wireless client (user).

Upon authenticating and authorizing the user, the VPN host network obtains a private IP address for the wireless user from its DHCP server. The private IP address is returned to the wireless access point 14 and an IP Sec tunnel or other VPN tunnel is established between the public VPN endpoint of the VPN host network 18 and the public VPN endpoint of the wireless access point 14. For a L3 tunnel, VPN endpoints will be IP addresses. The wireless network then assigns the private IP address to the wireless user and establishes a secure communications link with the wireless user using a wireless transmissions protocol. The secure communications session may be formed using WEP, TKIP, or Advanced Encryption Standard (AES), a wireless replacement for DES and 3DES, or any other protocol configured to secure transmissions on a wireless local area network.

Communications between the wireless user and the VPN host pass through the wireless access point. Specifically, if the wireless user 10 wishes to send data to the VPN host through the VPN tunnel, the wireless user 10 encrypts the data using the wireless LAN L2 encryption protocol in use on the wireless network and sends the data to the wireless access point 14. The wireless access point removes the encryption in use on the wireless network and sends the data out over the VPN tunnel to the VPN host network. Where the VPN tunnel is formed using encryption, such as IPSec encryption, the wireless access point encrypts the data using the agreed-upon encryption protocol prior to transmission to the VPN host network. Where the tunnel is formed using a MPLS encapsulation or other forms of encapsulation, the wireless access point encapsulates the data prior to transmission to the VPN host network. Optionally, both encryption and encapsulation may be used and the invention is not limited to a particular implementation of the VPN tunnel between the VPN host network and the wireless access point.

The wireless access point may support VPN tunnels with the VPN host networks by instantiating a virtual router to handle communications over the VPN tunnels, or may instantiate VPN routing and forwarding tables (VRF) pursuant to Internet Engineering Task Force (IETF) Request For Comments (RFC) 2547. The invention is not limited to any particular method of implementing the VPN on the wireless access point.

Transmissions from the VPN host network to the wireless user take place in a reverse manner. Specifically, the VPN host network will cause the data to be transmitted over the VPN tunnel to be encrypted and/or encapsulated and will transmit the data to the wireless access point. The wireless access point removes the encryption/encapsulation and encrypts the data to be transmitted over the wireless network using WEP, TKIP, AES or whatever other encryption standard has been agreed upon by the wireless user and the wireless access point. The encrypted data is then transmitted over the wireless network to the wireless user.

The wireless access point 14, in one embodiment, interfaces between a L3 VPN tunnel formed between the wireless access point and the VPN host network, and a L2 VPN tunnel between the wireless access point and the wireless user. In this embodiment, the wireless access point acts as a VPN gateway to the wireless network and functions to terminate L3 tunnels on behalf of wireless users. This is advantageous to the wireless user, as the wireless user is only required to have L2 encryption software to enable it to participate on a L3 VPN. This eliminates the need for the wireless user to instantiate a VPN client and reduces the requirements on the processor associated with the wireless user's network device since the network device will not be expected to participate as a VPN site on in an IP Sec or other VPN tunnel. Enabling the wireless access point to have an active role in the provision of VPN services is also advantageous in that it provides an additional revenue source for the wireless network provider.

Figure 3:
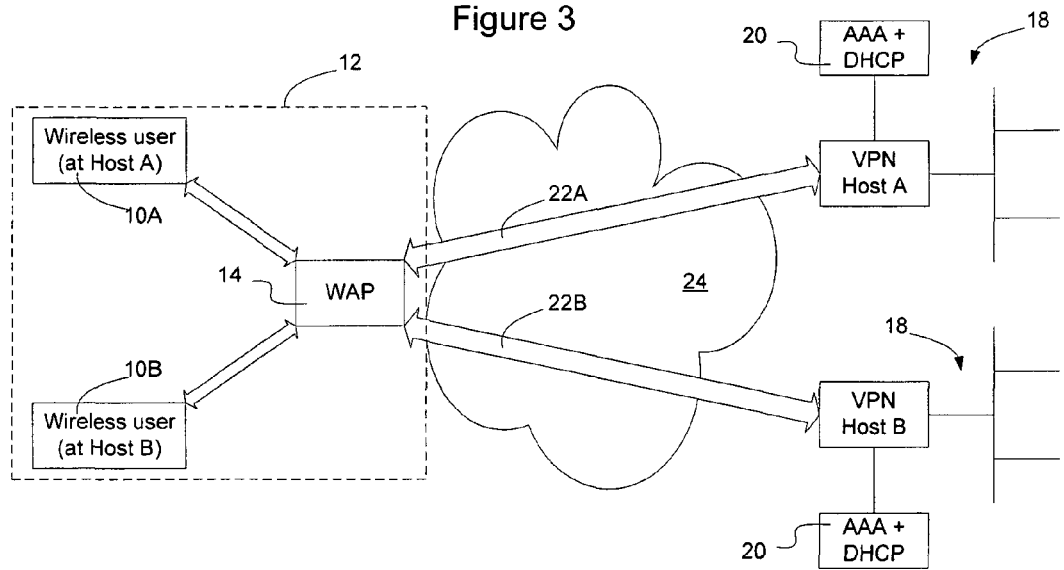
FIG. 3 is a functional block diagram of a wireless communications network configured to enable wireless users to establish VPN tunnels with different VPN host networks according to an embodiment of the invention.

The wireless access point 14 may be used to service multiple wireless users to enable the wireless users to access multiple VPN hosts. FIG. 3 illustrates an embodiment of the invention where two wireless users are seeking to participate in VPN tunnels with two VPN host networks. While the example of FIG. 3 will be used to describe features of the invention, the invention is not limited to a network in which only two wireless users are participating in VPN tunnels through the wireless network.

As shown in FIG. 3, a wireless user 10A seeking to access VPN host network A may establish a VPN tunnel 22A to VPN host network A through wireless access point 14. Similarly, a wireless user 10B seeking to access VPN host network B may establish a VPN tunnel 22B to VPN host network B through the wireless access point 14. A VPN ID associated with VPN tunnel 22A is used to identify communications from wireless user 10A and pass those communications over VPN tunnel 22A to VPN host network A. Similarly, a VPN ID associated with VPN tunnel 22B is used to identify communications from wireless user 10B and pass those communications over VPN tunnel 22B to VPN host network B. Communications from the VPN host networks will be addressed to different private IP addresses, and may arrive at different ports on wireless access device, and thus will be distinguishable as being addressed to particular wireless users. Thus, a single wireless access point may be able to provide VPN services to more than one wireless user.

Figure 1:
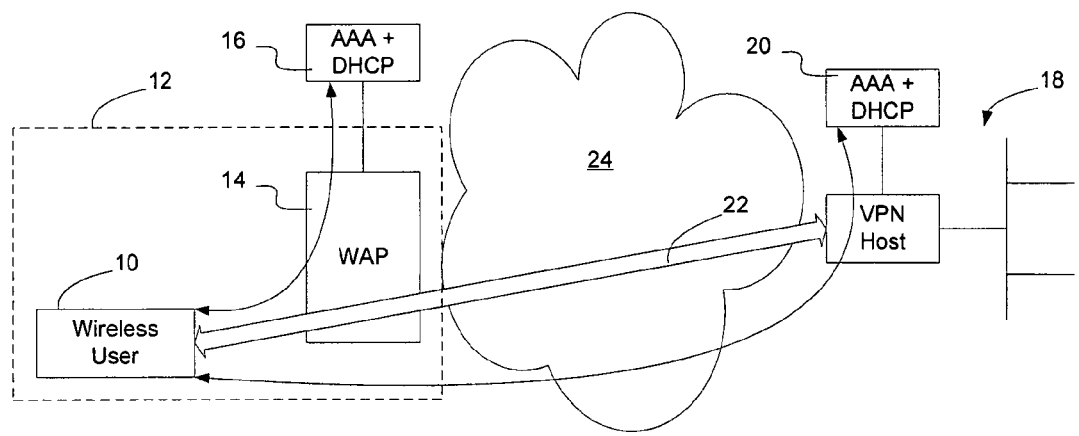
FIG. 1 is a functional block diagram of a conventional wireless communications network configured to enable a VPN tunnel to be established between a wireless user and a VPN host network.
Figure 4:
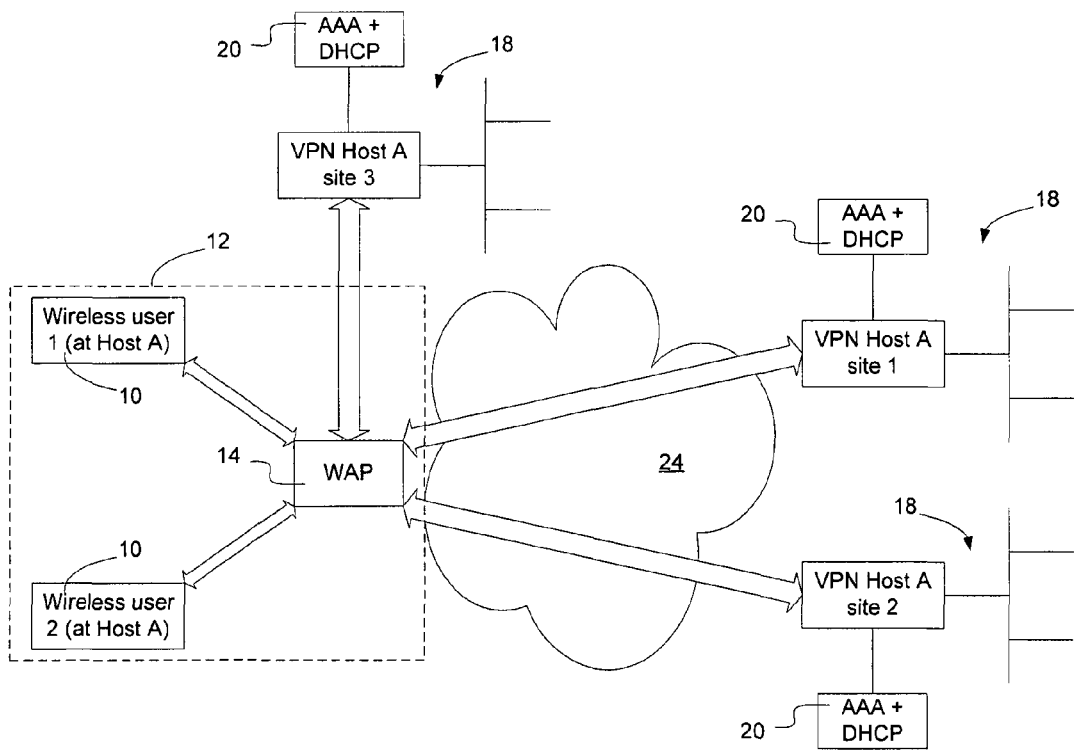
FIG. 4 is a functional block diagram of a wireless communications network configured to enable wireless users to establish VPN tunnels with multiple sites of the same VPN host network according to an embodiment of the invention.

FIG. 4 illustrates an embodiment of the invention in which a wireless access point 14 is configured to provide VPN connectivity to multiple VPN sites on a VPN as well as provide wireless access to wireless users. Specifically, as shown in FIG. 1, the wireless access point 14 enables network users and resources on VPN host A site 1, to access network users and resources on VPN host A site 2, and VPN host A site 3. Sites 2 and 3 are similarly able to access network users and resources on the other attached VPN host network sites.

In this embodiment, both wireless users may access VPN host network resources by joining one or more of the established VPN tunnels passing through the wireless access point 14. For example, assume that wireless user 1 desires to access VPN host A network resources. In this example, wireless user 1, upon performing the requisite authentication and authorization functions to obtain access to the VPN host A network, will be provided with a private IP address from one of the VPN host A AAA/DHCP servers. The private IP address as well as the tunnel IP address or VPN ID will be passed back to the wireless access point. Since an existing tunnel is already instantiated between the wireless access point and the VPN host network, the private IP address will be assigned by the wireless access point to the wireless user 1 and that private IP address will be associated with the VPN tunnel to the VPN host A network. Wireless user 2 may similarly access the network resources by joining the same VPN tunnel as wireless user 1, or may access the network resources by joining a different VPN tunnel. In this manner, the wireless access point is able to reuse existing tunnels to allow multiple wireless users to communicate with the VPN host network over a single tunnel, as well as by allowing wireless users to join existing tunnels.

In the embodiment illustrated in FIG. 4, three VPN sites associated with host network A are illustrated. Each of these three VPN sites, in the illustrated embodiment, is participating in a VPN tunnel that also includes the wireless access point. Each VPN site has a different prefix, which enables the wireless access point to direct traffic to the appropriate VPN site. In the embodiment illustrated in FIG. 4, the VPN tunnel is connected to the wireless access point. The invention is not limited to this embodiment but rather extends to any device configured to provide VPN services on the network. For example, a service provider will generally maintain a centralized VPN management center to manage VPN services for subscribers. The VPN management center generally functions to configure the subscriber network devices, handle communications between VPN customers and the service provider, monitor the status of the VPN networks, and provide any other services necessary or convenient to the VPN network and customers. Optionally, the wireless access point may establish a VPN tunnel to a VPN server at the VPN management center that is configured to handle the VPN on behalf of VPN host A network, although the invention is not limited in this regard.

Figure 5:
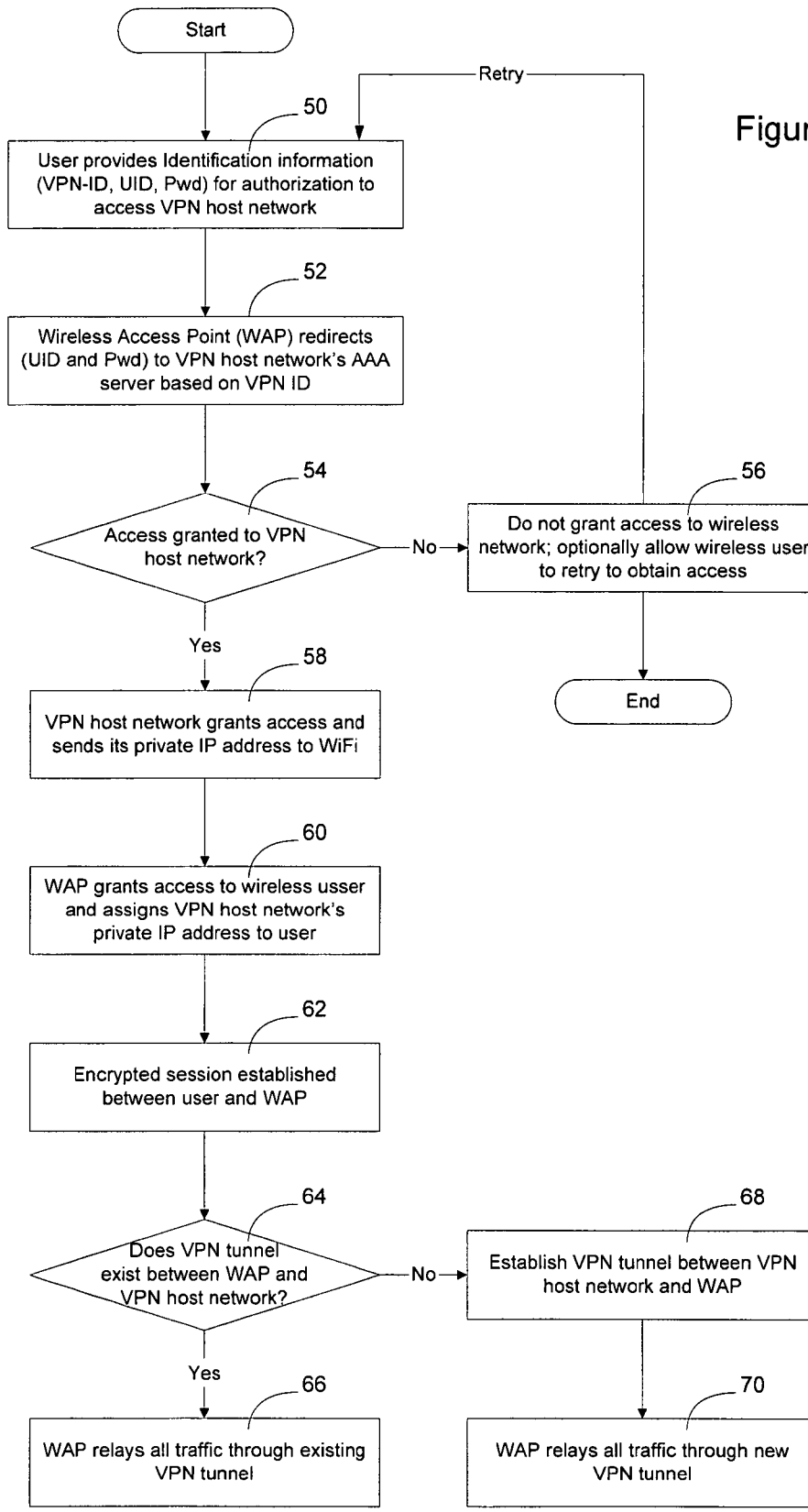
FIG. 5 is a flow-chart of a method for establishing VPN tunnels in a wireless network according to an embodiment of the invention.

FIG. 5 illustrates a flow chart of software that may be utilized in connection with one embodiment of the invention. As shown in FIG. 5, when a wireless user wishes to access a corporation's network or other VPN host network over a wireless network, the wireless user provides identification information associated with the user's identity on the VPN host network to the wireless access point (50). The identification information for the VPN host network may include the user's ID number (UID), user password (Pwd) and conceptual ID, such as a VPN ID, or the public IP address of the VPN host network VPN server. The identification information in one embodiment is unrelated to the wireless network and is not sufficient to authenticate or obtain authorization to enable the user to access the wireless network.

The wireless access point, upon receipt of the identification information, redirects the user ID and password to the VPN host network based on the VPN ID provided by the wireless user (52). The VPN host network evaluates the wireless user's credentials (54) to ascertain if the user is authenticated and authorized to obtain access to the VPN host network and/or the wireless network. The VPN host network may also evaluate account information to ascertain whether the user should be allowed to access the VPN host network or wireless network (e.g. the user may have an outstanding balance on its account which would prevent the user from continuing to receive services without first paying off a portion of its account).

If the user does not receive a favorable outcome from the VPN host network's AAA server, the wireless user is notified that it has failed to obtain access to the wireless network and/or the VPN services requested (56). At this point, the wireless user may be provided with an option to try again or the wireless session may terminate.

If the VPN host network decides to grant access to the wireless user, the VPN host network sends a private IP address to the wireless access point to be associated with the wireless user (58), and instructs the wireless access point to provide wireless services to the wireless user. The wireless access point grants access to the wireless user and assigns the private IP address to the wireless user (60). Obtaining IP addresses from the VPN host network DHCP server enables the wireless network to rely on the VPN host network for IP address allocation and maintenance.

The wireless access point initiates an encrypted communication session with the wireless user (62). The encrypted session may be initiated at this stage or initially when the wireless user first initiates communication on the wireless network. Establishing the encrypted session earlier in the process is advantageous in that the encrypted session allows for the secure transmission of identification information (50).

The wireless access point then ascertains whether the wireless user is seeking to join an already established VPN tunnel, or whether a new VPN tunnel needs to be established (64). If a VPN tunnel has already been established, the wireless access point relays all VPN traffic through the existing VPN tunnel to the VPN host network (66). If a VPN tunnel does not exist, a VPN tunnel (L2 or L3 tunnel) is established between the VPN host network and the wireless network (68). This new VPN tunnel is then used by the wireless network to relay all VPN traffic to the VPN host network (70).

Figure 6:
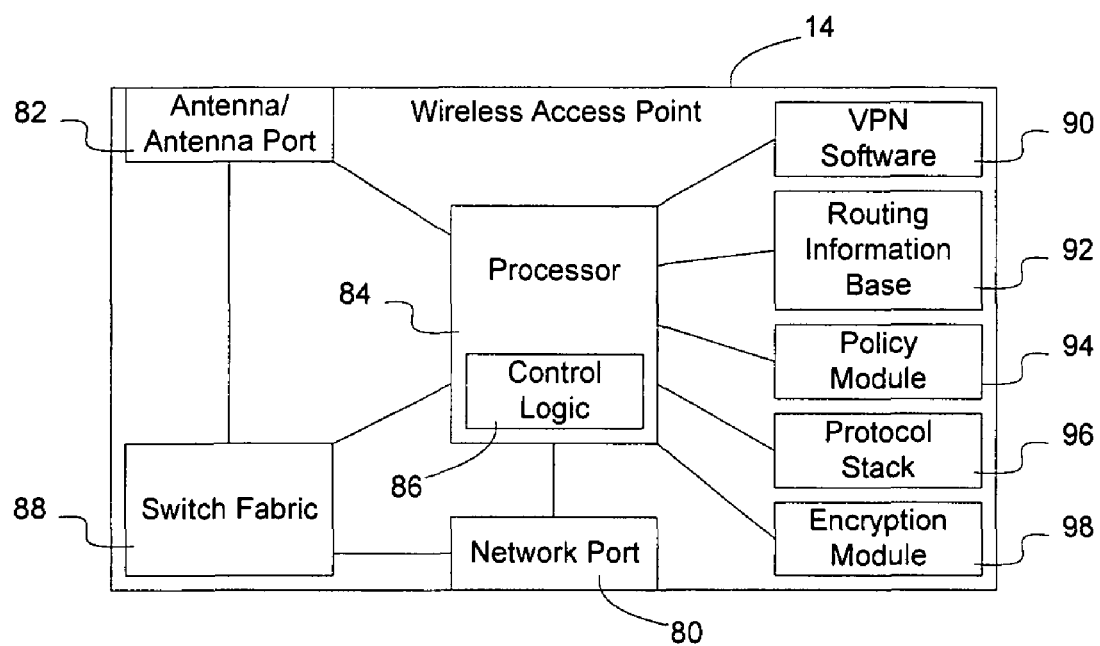
FIG. 6 is a functional block diagram of a wireless access point according to an embodiment of the invention.

One example of a wireless access point 14 according to an embodiment of the invention is illustrated in FIG. 6. The wireless access point, according to one embodiment of the invention, may be an aggregation switch serving to aggregate signals from many wireless network users and interface with higher bandwidth land-based communications networks, although the invention is not limited to this embodiment. As shown in FIG. 6, the wireless access point 14 in this embodiment includes network ports 80 configured to be connected to links in a communications network, and an antenna or antenna port 82 configured to interface with communications transmitted over at least a portion of the wireless spectrum.

The wireless access point may also include a processor 84 containing control logic 86 is configured to participate in establishing VPN tunnels between wireless users and VPN host networks as described above in greater detail. A switch fabric 88 is configured to redirect packets received at network ports 80 and wireless access ports 82 to other network ports or wireless access ports 82. Functions performed on the switch fabric are directed by the processor in connection with VPN software 90 and informed by routing information base 92 containing routing information or other information requisite to enabling packets to be directed to appropriate VPN tunnels.

Optionally, the wireless access point may also include various functional modules, such as an encryption module 94 configured to accelerate encryption of transmissions through the network ports 80 and/or the wireless access ports 82. A protocol stack 96 may be provided to enable the wireless access point to participate in protocol exchanges on the communications and wireless networks using known protocol conventions.

The wireless access point may also include a policy module 98 to enable the wireless access point to enforce a service level agreement with the wireless user to prevent the wireless user from obtaining bandwidth in excess of a predetermined level, and to attempt to ensure that the wireless user is provided with at least a minimum level of service. The invention is not limited in this regard, as the wireless access device may depend on other policy servers on the network to handle SLA enforcement.

The wireless access point may include additional or alternate components/processes configured to facilitate deployment of the functionality ascribed to it herein. The invention is thus not limited to a wireless access point or a system employing a wireless access point with only the enumerated components discussed herein, but rather extends to any wireless access point performing the functions described herein and as set out in the claims.

The control logic 86 of wireless access point 14 may be implemented as a set of program instructions that are stored in a computer readable memory within the network device and executed on a microprocessor, such as processor 84. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of establishing a VPN tunnel through a wireless network, the method comprising the steps of:
   passing identifying information associated with a wireless user to a VPN host network, the identifying information comprising a conceptual ID, user ID, and password;
   evaluating the identifying information by the VPN host network to obtain a VPN host network access result; and
   granting wireless access to the wireless user on the wireless network based on the VPN host network access result, to thereby enable both wireless network access and VPN host network access to be obtained without requiring evaluation of the identifying information by the wireless network.

2. The method of claim 1, wherein the step of evaluating comprises authenticating the wireless user based on the identifying information associated with the wireless user, and ascertaining whether the user is authorized to access at least one of the VPN host network and the wireless network.

3. The method of claim 1, wherein the step of passing identifying information to the VPN host network comprises receiving by the wireless network the identifying information, and transmitting by the wireless network at least a subset of the identifying information to the VPN host network.

4. The method of claim 3, wherein the subset of the identifying information comprises the user ID and password.

5. The method of claim 4, wherein the conceptual ID is not encrypted when received by the wireless network, and wherein the user ID and password are encrypted when received by the wireless network, and wherein the wireless network does not decrypt the user ID and password prior to transmitting the subset of the identifying information to the VPN host network.

6. The method of claim 1, further comprising a step of establishing a VPN tunnel between the VPN host network and the wireless network.

7. The method of claim 6,
   wherein the wireless network includes a wireless access point, and wherein the VPN tunnel is established between the VPN host network and the wireless access point.

8. The method of claim 1, further comprising assigning, by the VPN host network, an IP address for use by the wireless user.

9. The method of claim 1, further comprising a step of enabling the wireless user to access an established VPN tunnel with the VPN host network.

10. The method of claim 1, further comprising a step of establishing an encrypted session between the wireless user and the wireless network, and establishing a VPN tunnel between the wireless network and the VPN host network.

11. A wireless access point, comprising:
    a processor containing control logic configured to:
      establish an encrypted session with a wireless user; and
      establish a VPN tunnel to a VPN host network on behalf of the wireless user;
    wherein the control logic is configured to rely on the VPN host network for authentication and authorization services with respect to the wireless user.

12. The wireless access point of claim 11, wherein the VPN tunnel to the VPN host network is an IP Sec tunnel, and wherein the encrypted session with the wireless user comprises encrypting packets to be passed over the wireless network.

13. The wireless access point of claim 11, further comprising means for enabling the VPN host network to assign a private IP address to the wireless user.

14. The wireless access point of claim 11, a switch fabric configured to interface network ports and wireless access ports, and a routing information base configured to enable the control logic to route packets received at least one of the network ports and wireless access ports to another of the network ports and wireless access ports.

15. The wireless access point of claim 11, wherein the wireless access point is an aggregation point.

16. The wireless access point of claim 11, wherein the control logic is configured to map traffic received over the wireless network from the wireless network user to the VPN tunnel.

* * * * *